United States Patent [19]

Spracklen et al.

[11] 4,337,465
[45] Jun. 29, 1982

[54] LINE DRIVER CIRCUIT FOR A LOCAL AREA CONTENTION NETWORK

[75] Inventors: John E. Spracklen, San Diego, Calif.; Mark L. C. Gerhold, Paoli, Pa.

[73] Assignee: Burroughs Corporation, Detroit, Mich.

[21] Appl. No.: 190,568

[22] Filed: Sep. 25, 1980

[51] Int. Cl.³ .................. H04Q 9/00; H04L 5/14; H03K 17/56
[52] U.S. Cl. .................. 340/825.03; 178/2 R; 307/270; 370/85
[58] Field of Search .................. 307/270; 370/80, 85; 340/147 R; 178/2, 3

[56] References Cited

U.S. PATENT DOCUMENTS

| | | | |
|---|---|---|---|
| 3,297,954 | 1/1967 | Wiley | 307/270 |
| 3,358,216 | 12/1967 | Kostuch | 307/270 |
| 3,486,040 | 12/1969 | McMillin | 307/270 |
| 3,959,665 | 5/1976 | Gilbreath et al. | 307/270 |
| 3,969,639 | 7/1976 | Granberg et al. | 307/270 |
| 3,993,935 | 11/1976 | Philips et al. | 361/397 |
| 4,063,220 | 12/1977 | Metcalfe et al. | 340/147 R |
| 4,149,030 | 4/1979 | Foreman | 370/85 |
| 4,207,555 | 6/1980 | Trombly | 340/147 MD |
| 4,254,501 | 3/1981 | Griffith et al. | 370/85 |

Primary Examiner—Donald J. Yusko
Attorney, Agent, or Firm—Mervyn L. Young; Kevin R. Peterson

[57] ABSTRACT

This disclosure relates to a line driver circuit for a station in a data transmission network, which driver circuit is adapted to drive the channel medium with a constant current so that conflicts or collisions with data transmissions from other stations will be cancelled out thereby preventing any particular station from dominating reception of a neighboring station. Each station is adapted to operate in a cyclic mode for contending for access to the network channel where a three-state cycle is employed, which states are the idle state, the packet-being-transmitted state and the acknowledgment period state. Each station will not begin transmission until it determines that the tunnel is in an idle state. Once the station has determined that the channel is idle, it will then delay for a period of time that is randomly chosen and, if the channel is still idle, will then begin transmission. Following transmission, the channel will again be quiescent for a short period of time before the acknowledgment signal is transmitted from the receiver. Each packet of data to be transmitted is of a fixed length so as to provide for synchronization between the various stations contending for access to the channel.

7 Claims, 10 Drawing Figures

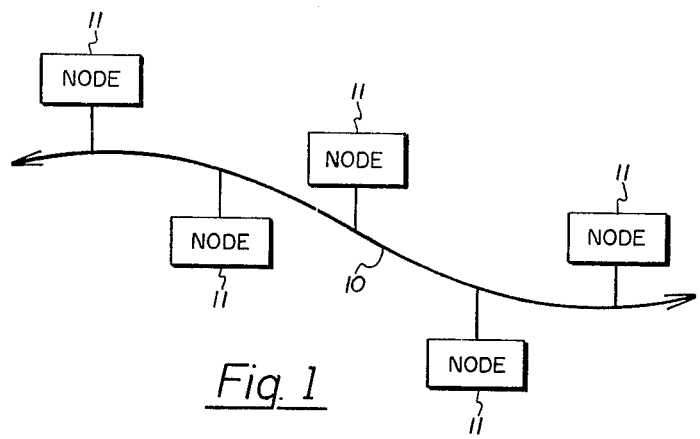
Fig. 1
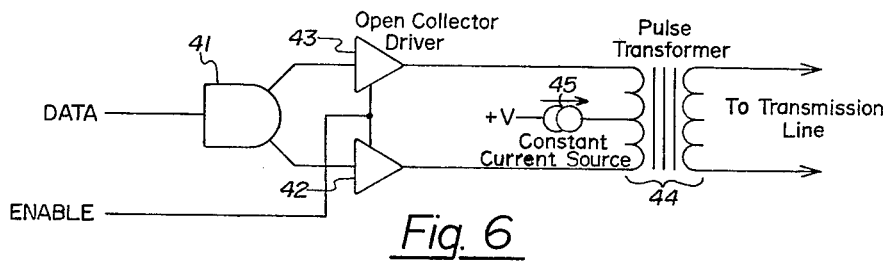
Fig. 6
| SYNC | Destination Address | Data | CRC |
Fig. 2

LINE DRIVER CIRCUIT FOR A LOCAL AREA CONTENTION NETWORK

BACKGROUND OF THE INVENTION

1 Field of the Invention

The invention relates to a line driver for a network of data stations and more particularly to such a network wherein control of the transmission between stations is shared by the respective stations.

2. Description of the Prior Art

Prior art terminal networks usually have been controlled by a master computer which receives transmission requests from the respective terminals and grants access to a transmission channel by the individual terminals when the channel is available and according to some priority arrangement. Such master computers add to the cost of the terminal network and are not required for some networks where the terminals need communicate only between themselves or with a common storage file. Thus, it is desirable to have a terminal network where the transmission control is imbedded in or shared by the stations making up that network.

Prior art networks not having a master controller have employed "contention" schemes whereby each node of the network contends for the transmission medium whenever it is ready to transmit. One of the earliest contention networks was the "Aloha" system built by the University of Hawaii. In this system, each node transmitted whenever it had a packet ready for transmission. Whenever a portion of one node's transmission overlapped with another node's transmission, that overlap destroyed both packets. If the sending node did not receive an acknowledgment within another packet from the destination node after an arbitrary time period, it would assume that a collision had occurred and retransmit. In order to avoid continuously repeated collisions, some method of introducing a random transmission delay had to be introduced.

An attempt at reducing the effects of collision in contention-type networks is disclosed in the Metcalfe et al U.S. Pat. No. 4,063,220 which is directed toward a communication network in which each node is capable of detecting when collision occurs on the channel during that node's transmission, and interrupts its transmission when such a collision occurs. A random number generator is employed to select an interval of time to delay before the next attempted transmission. However, the collision detection mechanism adds to the complexity of the respective nodes with an increase in the cost of the system. Another contention-type network which does not require collision detection mechanisms is disclosed in the Malcolm et al U.S. Pat. Application Ser. No. 145,606 filed May 1, 1980 wherein each station will not begin transmission until it determines that the channel is in an idle state and, once the station has determined the channel is idle, it will then delay for a period of time that is randomly chosen; and, if the channel is still idle, will then begin transmission. With this type of system, a relative synchronization between transmission cycles for the various stations occurs, thus minimizing collision. If collision does occur, it is detected by the receiving station as a data error and that station simply does not return an acknowledgment signal.

A particular problem with contention networks is that when two different stations attempt to drive the channel at the same time and are separated by a relatively large distance, the transmission of each station will dominate nearby stations, thereby preventing their receiving transmission from a distant station.

It is, then, an object of the present invention to provide an improved line driver circuit for different stations in a contention network.

It is another object of the present invention to provide an improved line driver circuit for a station in a contention network where each node or station contends for access to the channel medium in a manner such as to minimize conflicts between the respective stations.

It is still another object of the present invention to provide an improved line driver circuit for a station in a data communication network, which driver circuit will not dominate reception by neighboring stations of transmissions from a distant station.

SUMMARY OF THE INVENTION

In order to achieve the above-identified objects, the present invention is directed toward a line driver circuit for a station in a data transmission network, which driver circuit is adapted to drive the channel medium with a constant current so that conflicts or collision with data transmission from other stations will be cancelled out, thereby preventing any particular station from dominating reception of a neighboring station. Each station is adapted to operate in a cyclic mode for contending for access to the network channel where a three-state cycle is employed, which states are the idle state, the packet-being-transmitted state and the acknowledgment period state. Each station will not begin transmission until it determines that the channel is in an idle state. Once the station has determined that the channel is idle, it will then delay for a period of time that is randomly chosen and, if the channel is still idle, will then begin transmission. Following transmission, the channel will again be quiescent for a short period of time before the acknowledgment signal is transmitted from the receiver. Each packet of data to be transmitted is of a fixed length so as to provide for synchronization between the various stations contending for access to the channel.

A feature then of the present invention resides in a line driver circuit for a station in a data transmission network, which circuit drives the channel with a constant current so that its transmission will cancel out transmission of other stations contending for access to the network channel.

BRIEF DESCRIPTION OF THE DRAWINGS

The above and other objects, advantages and features of the present invention will become more readily apparent from a review of the following specification wherein:

FIG. 1 is a representation of a network employing the present invention;

FIG. 2 is a diagram of an information packet employed in the present invention;

FIG. 6 is a schematic representation of the line driver of the present invention.

GENERAL DESCRIPTION OF THE INVENTION

The present invention is directed toward a line driver circuit for an interface which is used to connect stations into a local area communication network. The network uses a shared communication channel and distributed control. There is no central arbitrator of channel utilization. The shared communication medium can be a twisted pair, a coaxial cable, fiber optics, and so forth, as illustrated in FIG. 1.

The data structure employed is illustrated in FIG. 2 and is a fixed-size packet which contains a fixed number of data bits along with the information necessary for interface synchronization, message routing and error detection. As illustrated in FIG. 2, the first field of the packet is the SYNC code which is a 4-bit field that indicates that information follows and serves to synchronize the receiving node for the reception of the information packet which follows. The second field is the Destination Address code which is 16 bits long and designates the stations for which the message is destined. The Data Field consists of 132 8-bit bytes. The last field is the Cyclic Redundancy Check (CRC) code which contains a 16-bit error detection code. A new CRC code is generated by the node during packet reception and checked against the transmitted CRC code. Other means of error detection are also employed.

As was indicated above, the present invention is directed toward employment in a contention network. That is to say, each station of the network transmits packets independently of the other stations or nodes, possibly interfering or colliding with other transmissions. If the transmitted packet is received correctly by the destination station, then the receiver responds with an acknowledgment signal. If the acknowledgment signal is not received by the transmitting station during the acknowledgment period immediately following the packet transmission, then the transmitter assumes that the transmission was unsuccessful.

Figure 3A:
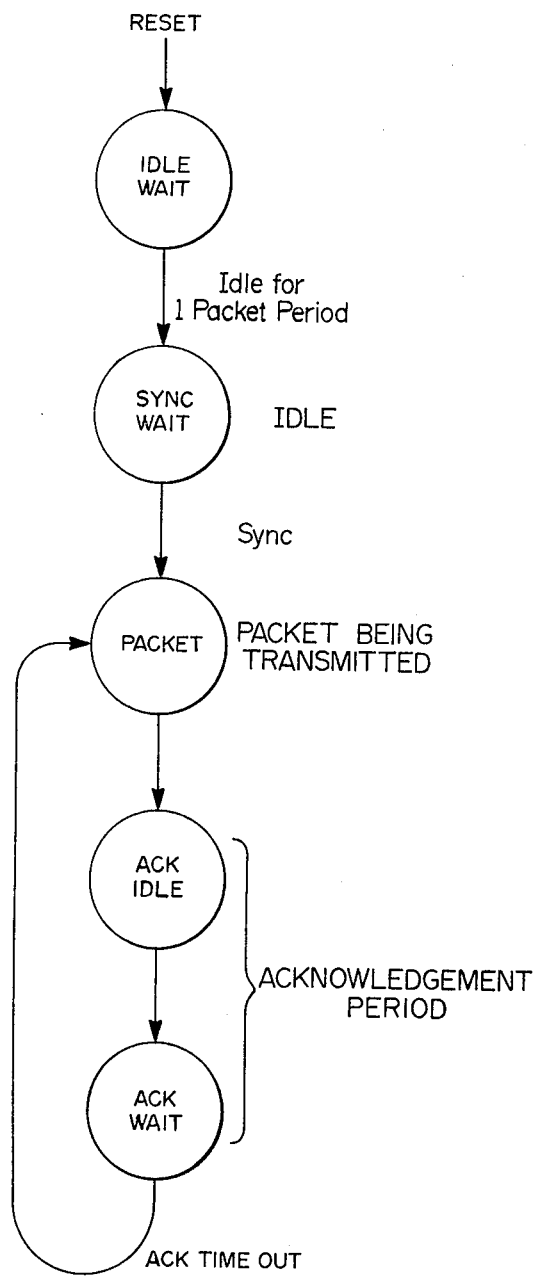
FIGS. 3A and 3B are flow charts illustrating, respectively, the channel state machine and the transmission method of the present invention.

The channel state machine for each node in a network employing the present invention is illustrated in FIG. 3A. As indicated therein, the network channel cycles sequentially through three states: idle, packet-being-transmitted, and the acknowledgment period. Each station continually monitors the channel and keeps track of its state. Because there is a propagation delay for the signal, the exact times of transitions between the states vary from point to point along the network, but they are all synchronized within a fixed time interval.

The specific cycle of the channel state machine will now be described with relation to FIG. 3A. Upon reset or power up, the channel's state machine enters the SYNC WAIT state after the channel has been quiescent for at least one packet transmission period. Upon detection of any data on the channel (e.g., the SYNC code of the packet), the channel state machine enters the PACKET state which lasts a fixed amount of time. After the PACKET state, the channel state machine enters the ACKNOWLEDGMENT IDLE state followed by the ACKNOWLEDGMENT WAIT state, each of a fixed duration. After the ACKNOWLEDGMENT WAIT state, the channel state machine returns to the SYNC WAIT state.

As disclosed in FIG. 3A, the states of the channel state machine correspond to the network channel states as follows: the channel state machine is in the SYNC WAIT state whenever the channel is in the idle state, the PACKET state whenever the channel is in the packet-being-transmitted state, and the ACKNOWLEDGMENT IDLE or ACKNOWLEDGMENT WAIT state whenever the channel is in the acknowledgment period state. The channel should be quiescent during the ACKNOWLEDGMENT IDLE state of the channel state machine; if it is not (i.e., if any channel activity is detected during the ACKNOWLEDGMENT IDLE state), it is considered an error in the present transmission even if the ACKNOWLEDGMENT signal appears on the channel during this subsequent ACKNOWLEDGMENT WAIT state.

Figure 3B:
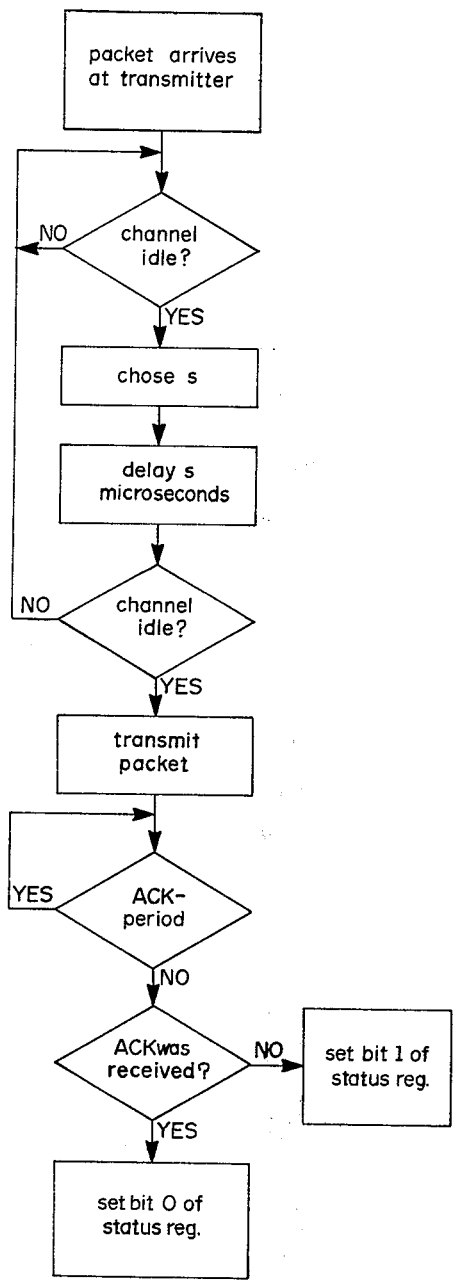

When a packet to be transmitted is loaded into the interface of a particular node, that interface operates in a manner that will now be described in relation to FIG. 3B.

Step 1. Upon arrival of the packet to be transmitted, the interface checks to see if the channel is idle. If the channel is either in the packet-being-transmitted state or the acknowledgment state, then the transmitter waits until the channel becomes idle.

Step 2. An integer s is chosen randomly in the interval [O,S] with each of the S+1 possible choices being equally probable. The transmitter then delays for s microseconds. If the channel is still idle at the end of the delay, then the packet is transmitted. If at that time, the channel is not idle, then the transmitter goes back to Step 1.

Step 3. The transmitter waits for the acknowledgment period to be completed. It then sets the interface status register according to whether or not an acknowledgment signal was received during the acknowledgment period. The setting of the status register causes an interrupt request of the resident computer.

The choice of S is somewhat arbitrary depending upon the transmission speed and the packet length. In the present invention, a value of about $10^8$ divided by the channel baud rate should perform well over a wide range of packet loads. An important parameter is the propagation delay time t from one end of the network to the other, which is used to determine the duration of the acknowledgment period. For a 5,000 foot cable medium, the propagation delay time t is approximately 8 microseconds. When the transmitter and the receiver are at opposite ends of the network, the last bit transmitted requires t microseconds to arrive at the receiver. The receiver then delays for a period of 2t before transmitting the acknowledgment signal. The acknowledgment signal requires another t microseconds to arrive at the transmitter node. After transmitting the acknowledgment signal, the receiver sets the interface status register to indicate that a packet has been received. The setting of the status register causes an interrupt request of the resident computer.

With a network of stations as described above, the PACKET state of the channel state machine for each station will always be of a fixed duration, namely the packet transmission time. The receiver will wait for a time 2t before replying with the acknowledgment signal and then another time 2t for the idle state to begin. If the receiver detects any activity on the channel during the first waiting period, at the end of the packet-being-transmitted state, it will send the acknowledgment signal. If the transmitter detects any channel activity during the first waiting period following the transmission of the packet, it will ignore any acknowledgment signal on the channel during the following ACKNOWLEDGMENT WAIT state.

With the conditions described above, it can be demonstrated that the channel state machine of each terminal in the network will be synchronized within a time t of all other station channel state machines, and that a transmitting station will receive a valid ACKNOWLEDGMENT signal only if the intended receiver has correctly received the packet.

As was indicated above, a particular problem with a contention-type network is that when two stations attempt to transmit at the same time and they are separated by a relatively large distance, the transmission of each station will tend to dominate nearby stations and prevent their receiving transmission from the distant station. To this end, the present invention is directed toward a line driver circuit which drives the common bus of the network with a constant current so that signals on the bus add or subtract, causing a loss of data over the entire circuit that can be detected by the prospective receiving stations.

DETAILED DESCRIPTION OF THE INVENTION

A resident computer in each station is coupled to the channel by an interface employing the present invention. Received packets and packets to be transmitted are transferred between the interface and the resident computer across a single-byte input/output port P as described below. An interrupt request signal and two reset signals complete the interface to the resident computer. Operations that can be performed on the interface are Reset, Read Status, Load Packet, and Unload Packet.

Figure 4A:
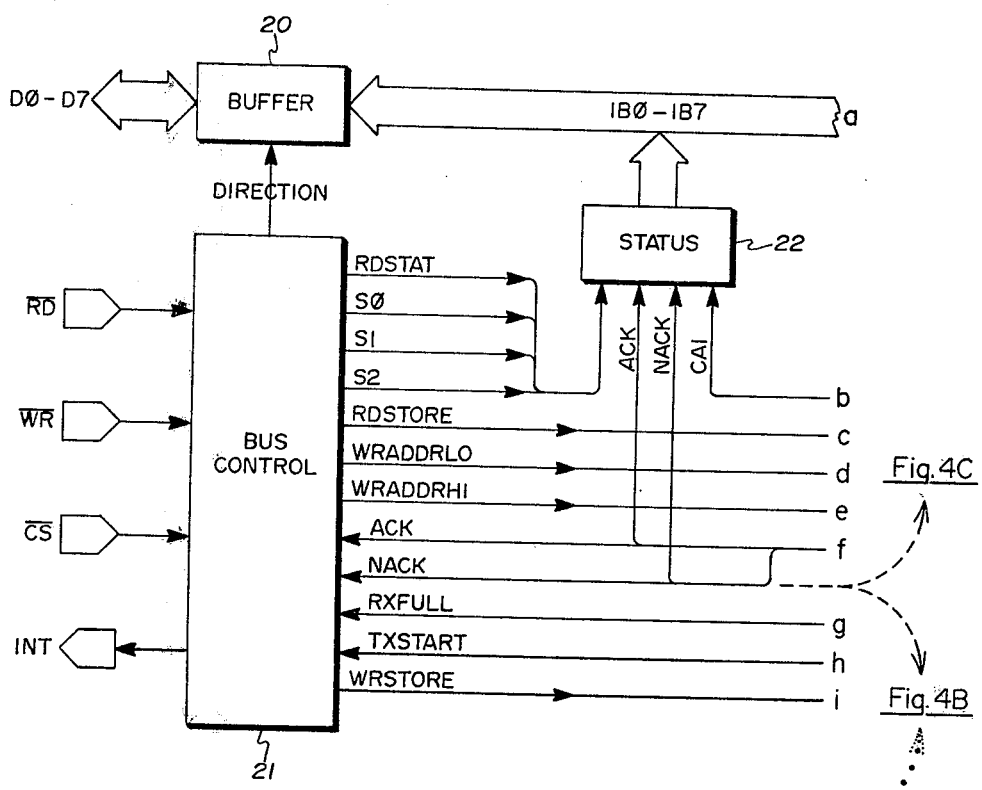
FIGS. 4A, 4B and 4C are schematic diagrams illustrating the terminal interface of the present invention.
Figure 4B:
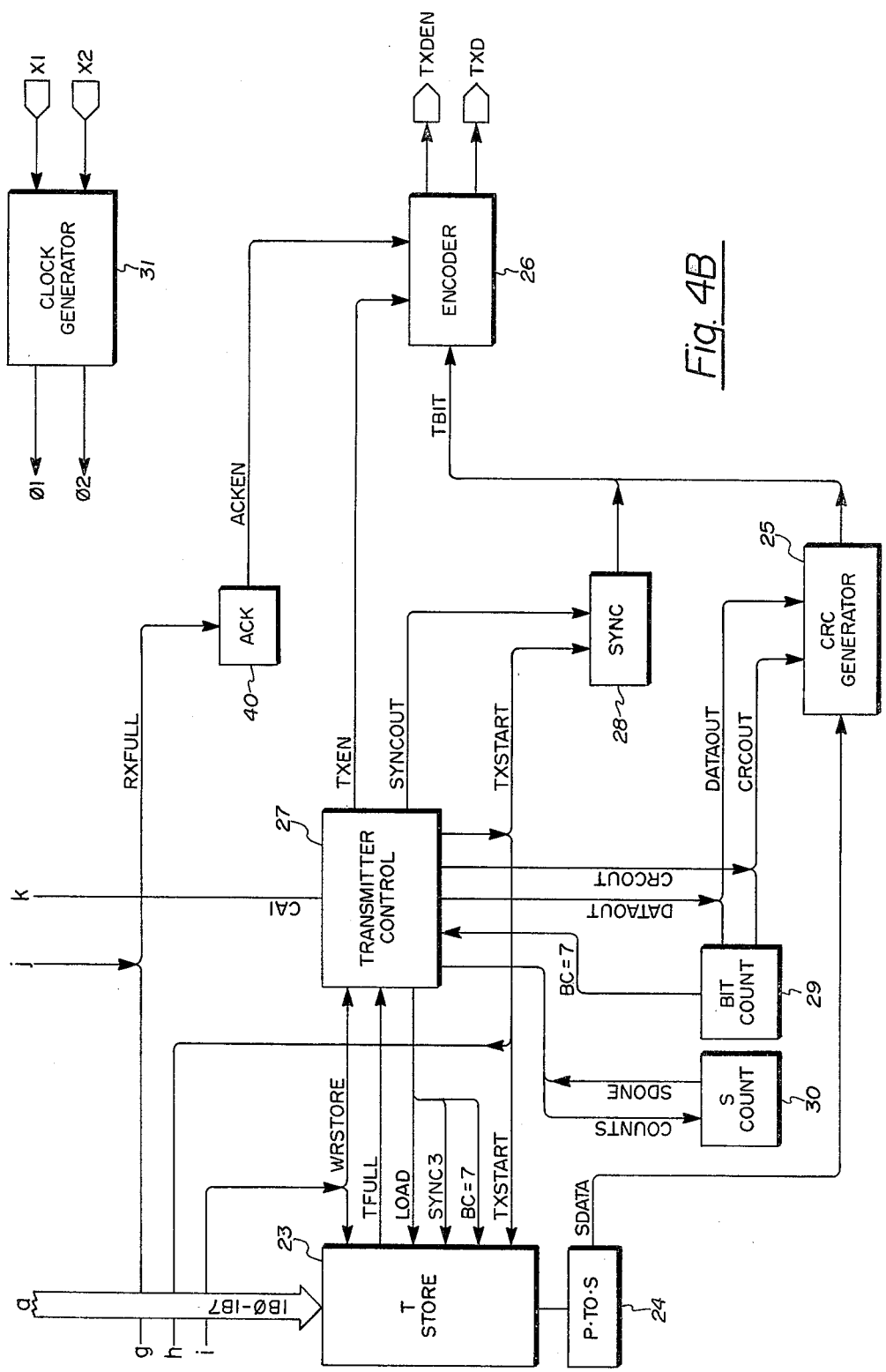
Figure 4C:
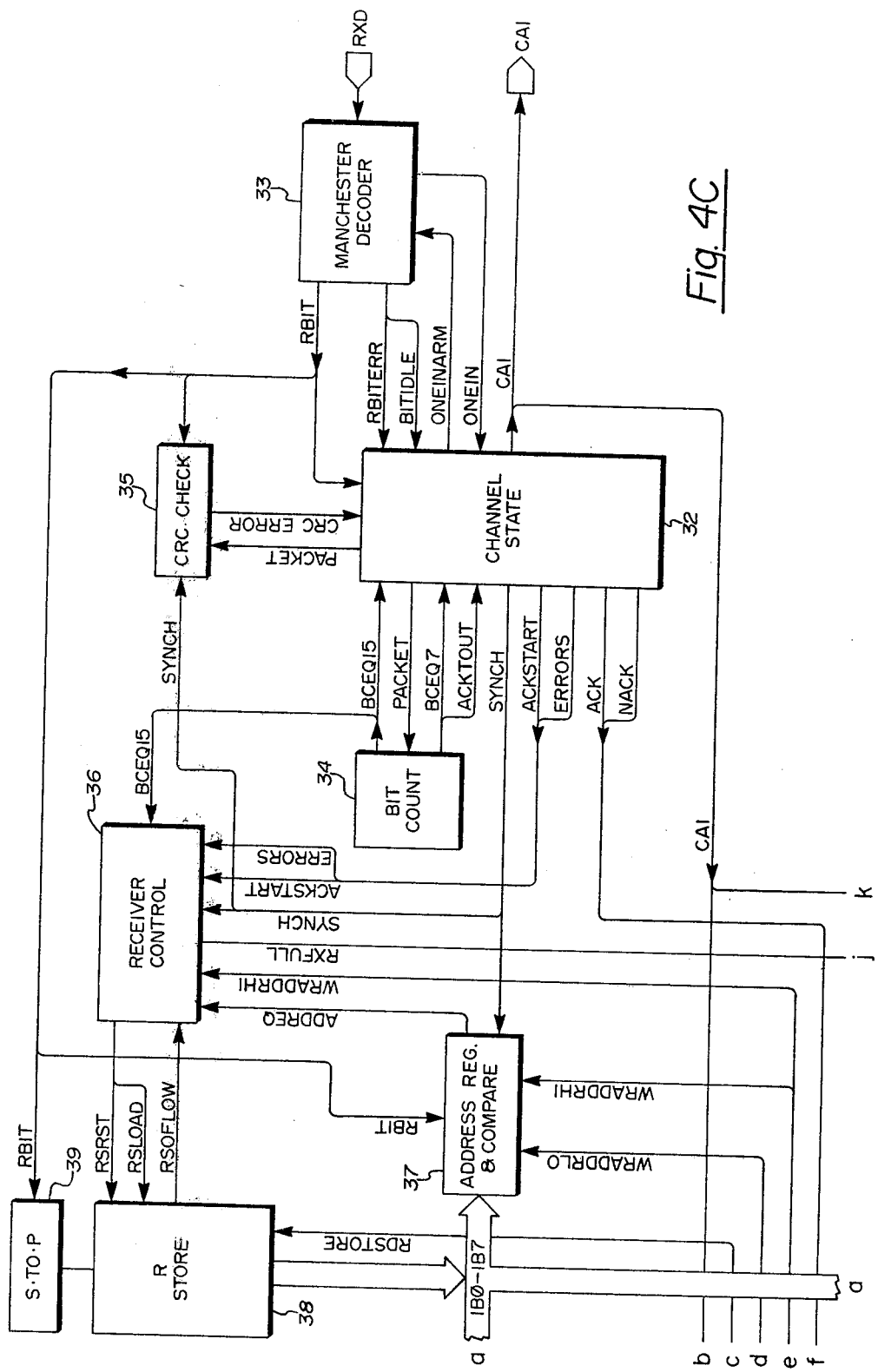

The interface between the resident computer and the channel is illustrated in FIGS. 4A–C. The interface communicates with the resident computer through a set of signals consisting of Read $\overline{RD}$, Write $\overline{WR}$, Circuit Select $\overline{CS}$, Interrupt Request $\overline{INT}$, and an 8-bit data bus. The transmitter loads packets from the resident computer and transmits them over the channel according to the transmission algorithm described above. The receiver receives packets from the channel and unloads them to the resident computer. The tasks of CRC generation and checking, line monitoring and data encoding are done by the interface and not by the resident computer. Since the receiver and transmitter are independent, they can both be active at the same time, as when the transmitter is sending a packet while the receiver is unloading a different packet to the resident computer.

In FIG. 4A, data is transferred between the resident computer and the interface by way of port P which comprises buffer 20 and bus control 21. Data bus buffer 20 is a bi-directional buffer for the 8 data signals which comprise the input/output port P. The data transfer depends upon the states of the Read $\overline{RD}$, Write $\overline{WR}$, and Circuit Select $\overline{CS}$ signals to bus control 21.

Status register 22 contains bits to indicate the state of the interface and the channel in the following manner:

| Bit | Status |
|---|---|
| 0 | Transmission complete, ACK received. (reset when status byte is read) |
| 1 | Transmission complete, no ACK received. (reset when status byte is read) |
| 2 | Correct packet received. (reset when status byte is read) |
| 3 | Not used. |
| 4 | Not used. |
| 5 | Channel activity indicator (1 when channel is busy; 0 when channel is idle) |
| 6 | An ACK signal was detected on the channel, indicating a good packet transmission. (reset when status byte is read) |
| 7 | Bad data on channel. A bad packet, a collision, or noise was detected on the channel. (reset when status byte is read) |

Bus control 21 responds to the $\overline{RD}$ and $\overline{CS}$ signals with the read operation and the $\overline{WR}$ and $\overline{CS}$ signals with the write operation. Bus control 21 maintains a simple state machine to determine the source (or destination) of the read or write operations. Possible sources of read data are status register 22 and receiver store 38. Destinations for written data are address register 37 and transmitter store 23.

In FIG. 4B, transmitter store 23 holds a packet of data to be transmitted. It is a FIFO store of 134 bytes (132 for data and 2 for the destination address). Data to be transmitted leaves the transmitter store 23 by way of parallel-to-serial buffer 24. Data transmission is controlled by transmitter control 27 which initiates a packet transmission employing the transmission algorithm described above and in accordance with the value from S count unit 30. S count unit 30 is comprised of a counter driven by a random clock (neither of which is shown). Transmitter control 27 also synchronizes the other parts of the transmitter to insure packet transmission.

CRC generator 25 builds the CRC code of the packet being transmitted as data in the transmitter store 23 is being transmitted. When transmitter store 23 becomes empty, the resultant CRC code is transmitted. As was indicated above, the first field of the packet is a 4-bit SYNC code which is generated by SYNC generator 28.

The packet being transmitted passes through encoder 26 which encodes each bit in a Manchester code before transmission. The four sources of data to be transmitted (as indicated above) are the SYNC code 28, the transmitter store 23 (for destination address and data), the CRC generator 25, and the acknowledgment code 40. The output select decides which of these, if any, is to be sent.

As was indicated above, the three possible channel states (idle, packet-being-transmitted, and acknowledgment) are maintained in channel state 32 of FIG. 4C for use by both the transmitter and receiver. A timer is required for each change of state. A timer is also used by the transmitter in the delay portion of the transmission algorithm as was described above. Input decoder 33 is a Manchester decoder which receives data from the channel. It thus converts the Manchester encoded data into unencoded data. The SYNC code can also be recognized at this point and separated from the data. CRC check 35 is the opposite of CRC generator 25 and serves to verify the correctness of the incoming data.

Receiver store 38 buffers a packet received from the channel to be read by the resident computer. The data enters the receiver store 38 by way of serial-to-parallel buffer 39. Receiver control 36 synchronizes the parts of the receiver in order to insure correct packet reception.

On Reset, the interface is loaded from the resident computer with its address. Thereafter, when the packet is detected on the channel and the receiver store 38 is empty, address compare logic 37 checks to see if the packet is intended for the resident computer by comparing the incoming address against the stored address.

Figure 5:
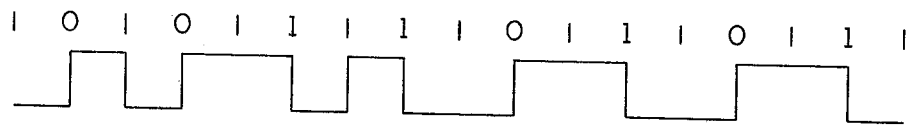
FIG. 5 is a representation of signals in Manchester code as employed in the present invention.

Manchester encoding is employed to send data with an imbedded clock and no DC bias. It is characterized by always having a transition during the middle of a bit interval as illustrated in FIG. 5. A logic 0 is a positive going transition while a logic 1 is a negative going transmission.

The line driver circuit of the present invention is illustrated in FIG. 6 where encoded data from encoder 26 of FIG. 4B is received by gate 41 which supplies both true and false output signals that respectively drive open collector drivers 43 and 42 that in turn are coupled to the respective ends of the primary winding of pulse transformer 44. A constant current source is coupled to feed a constant current to the center tap of the primary winding; and the secondary winding of pulse transformer 44 then drives the transmission line 10 of FIG. 1. The line driver circuit of FIG. 6 is shown in more detail in FIG. 7 and may be of a type that is commercially available such as dual differential line drivers SN 75113 manufactured by Texas Instruments, Incorporated.

Figure 7:
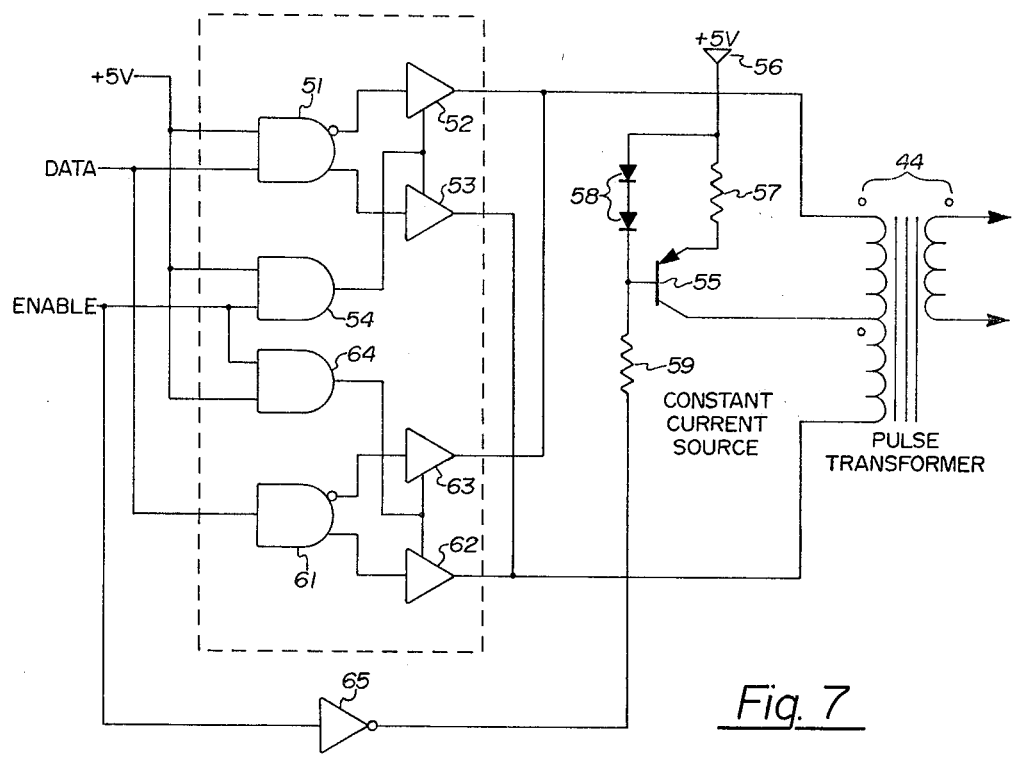

In FIG. 7, gate 51 is equivalent to gate 41 of FIG. 6 and open collector circuits 52 and 53 are respectively equivalent of corresponding circuits 42 and 43 in FIG. 6. Since the particular circuit shown in FIG. 7 is a dual differential line driver circuit, gates 61 and open collector circuits 62 and 63 are also employed to drive pulse transformer 44 and serve supplemental functions corresponding to the respective gate 51 and circuits 52 and 53. The enable signal is received by gates 54 and 64 which supplement one another in supplying the enable signal to the respective open collector circuits. That enable signal is also supplied by way of inverter 65 to the constant current source which, in FIG. 7, includes transistor 55, the emitter of which is coupled by way of resistor 57 to constant voltage source 56 which in turn is also coupled to the base of transistor 55 by way of diodes 58.

The purpose of the pulse transformer is to provide DC isolation between the interface and the transmission line which readily accommodates the Manchester encoded data as was described above. The constant current source and the pulse transformer serve to force signals onto the transmission line to cancel any opposite signal that is also being forced on the line at the same time. Without the constant current source, the differential line driver would change its source current as the load changed. When a collision occurred, the line driver would either source more current or less current to overcome the changing load on the transmission line due to the collision. The signal difference would be lost over the distance of the transmission line rather than being cancelled. By forcing a constant current onto the line, the line driver is not allowed to overcome the changing load and algebraic summing is forced to occur. In this manner, the swamping effect over a localized area and domination of the transmission line in the area of neighboring stations is eliminated.

EPILOGUE

A line driver circuit has been disclosed for a station in a data transmission network, which driver circuit is adapted to drive the channel medium with a constant current so that conflicts or collisions with data transmissions from other stations will be cancelled out thereby preventing any particular station from dominating reception of a neighboring station. The constant current source and the pulse transformer serve to force signals onto the transmission line to cancel any opposite signals that are also being forced on the line at the same time.

While but one embodiment of the present invention has been disclosed, it will be apparent to one skilled in the art that variations and modifications may be made therein without departing from the spirit and scope of the invention as claimed.

What is claimed is:

1. A station in a local area data communication network coupled to a local area communication channel, said station comprising:
   sensing means to detect when said channel is inactive;
   clock means to determine a random period of time after said sensing means detects no activity on said channel; and
   transmitting means to transmit an information packet on said channel after said random period of time and when there is no activity on said channel, said transmitting means including line driver means comprising: a pulse transformer having a primary winding with a center tap and a secondary winding, said secondary winding being coupled to said communication channel; a constant current source coupled to said center tap of said primary winding; and circuit means coupled to the respective ends of said primary winding to receive current from one end thereof or the other end thereof in accordance with a data signal to be transmitted on said channel so as to cancel out signals being transmitted by other stations contending for access to said channel.

2. A station according to claim 1 wherein:
   said circuit means includes a pair of open collector drivers to respectively couple a corresponding end of said primary winding to ground.

3. A station according to claim 1 further including:
   enable means to place said circuit means and said constant current means in a conducting condition.

4. A station according to claim 2 further including:
   receiving means to receive an acknowledgment signal on said channel within a fixed time interval after said packet has been transmitted.

5. A station according to claim 2 wherein:
   said clock means includes counter means driven by a random clock.

6. A station according to claim 2 wherein:
   said transmitting means transmits said packet during a fixed period of time.

7. A station according to claim 2 further including:
   channel state means to maintain said station in a sequence of states which include, in order, the channel idle state, packet-being-transmitted state, and acknowledgment period state.

* * * * *